United States Patent

Brunie et al.

[11] 3,719,706

[45] March 6, 1973

[54] PROCESS FOR OBTAINING 6-HEXANALOIC ACID

[75] Inventors: Jean Claude Brunie; Michel Costantini; Noel Crenne, all of Lyon; Michel Jouffret, Villeurbanne, all of France

[73] Assignee: Rhone-Poulenc S.A., Paris, France

[22] Filed: June 3, 1970

[21] Appl. No.: 43,193

[30] Foreign Application Priority Data

June 4, 1969 France..................................6918411

[52] U.S. Cl. ............................260/533 C, 260/526 R
[51] Int. Cl...............................................C07c 51/18
[58] Field of Search.........260/533 C, 586 B, 531 R, 260/526 R

[56] References Cited

UNITED STATES PATENTS

| | | | |
|---|---|---|---|
| 2,931,834 | 4/1960 | Crouch et al. | 260/586 B |
| 3,277,168 | 10/1966 | Koenig | 260/586 B X |
| 3,515,751 | 6/1970 | Oberster et al. | 260/533 C |

OTHER PUBLICATIONS

Krause et al., C.A., 1963, Vol. 59, 8158e.

Umeda et al., Nippon Kagaku Zasshi, Vol. 84, pp. 464–467, (1963).

Swern, Organic Peroxides, Wiley, May 15, 1970, pp. 22.

House, Modern Synthetic Reactions, Benjamin, (1965), pg. 82.

Fieser et al., Reagents for Org. Chem., Wiley, 1967, pp. 142–151 & 538.

*Primary Examiner*—Lorraine A. Weinberger
*Assistant Examiner*—Richard D. Kelly
*Attorney*—Stevens, Davis, Miller & Mosher

[57] ABSTRACT

6-Hexanaloic acid is obtained from by-products present in cyclohexyl hydroperoxide solutions, obtained by oxidation of cyclohexane in the liquid phase, without a metallic catalyst, by means of a gas containing molecular oxygen, by washing said cyclohexyl hydroperoxide solutions with water, separating the aqueous wash solutions, and subjecting the 6-hydroperoxyhexanoic acid contained in the wash solutions to deperoxidation by means of a chromium catalyst, e.g. chromium oxide or hydrated chromium chloride, in aqueous solution.

15 Claims, No Drawings

PROCESS FOR OBTAINING 6-HEXANALOIC ACID

This invention relates to a process for obtaining 6-hexanaloic acid from by-products present in the solutions of cyclohexyl hydroperoxide obtained by oxidation of cyclohexane in the liquid phase, without a metallic catalyst, by means of a gas containing molecular oxygen.

It is well known to oxidize cyclohexane by gaseous mixtures containing molecular oxygen to give solutions in which the nature and proportion of the oxidation products vary considerably depending on the conditions under which the oxidation is carried out.

Thus, principally cyclohexanol and cyclohexanone are obtained during the oxidation by air of cyclohexane in the liquid phase and in the presence of metallic catalysts such as cobalt derivatives. It is known to remove, before distillation of the final products, at least a part of the by-products formed during the oxidation by washing with water or alkaline solutions, either at the end of the oxidation or during or between the various oxidation stages. In addition to diacids, such as succinic, glutaric and adipic acids, the aqueous wash solutions thus obtained contain hydroxycaproic acid and polymers derived therefrom which can, according to known procedures, be isolated by extraction or transformed by chemical treatment of these solutions.

It is furthermore known that oxidation products of cyclohexane can be obtained in which the proportion of cyclohexyl hydroperoxide in the oxidized products is relatively high, if certain conditions of carrying out the process are observed. Amongst these, it has been proposed to carry out the oxidation without a catalyst, to allow the reagents a very short dwell time in the oxidizing equipment, and to carry out the process at relatively low temperatures, with low degrees of conversion and in an apparatus which does not catalyze the decomposition of the hydroperoxides. Along these lines, it has also been proposed to carry out the process in the presence of sequestering agents for metals, or to treat the cyclohexane which is recycled to the oxidation zone with a basic agent.

Despite these various measures, which undoubtedly contribute to increasing the yield of cyclohexyl hydroperoxide in the oxidation products, the amount of by-products which, nevertheless, forms during the oxidation is still considerable. Of the by-products, only cyclohexanol, cyclohexanone and adipic acid have hitherto been of interest because they constitute fundamental starting materials for chemical industry. Now, in view of the increasing importance of the preparation of cyclohexane solutions of cyclohexyl hydroperoxide, the utilization of the by-products which they contain, other than those mentioned above, has become a problem which requires solution.

The present invention, the purpose of which is to make a contribution to the solution of this problem, has as its object a process for obtaining 6-hexanaloic acid from the oxidation by-products present in the cyclohexyl hydroperoxide solutions obtained by oxidation of cyclohexane in the liquid phase, without a metallic catalyst, by means of a gas containing molecular oxygen.

This process comprises washing these oxidation solutions with water, separating the aqueous phase, and subjecting the 6-hydroperoxyhexanoic acid contained in the wash solution, if desired after its extraction, to dehydroperoxidation by the action of an aqueous solution of a catalyst consisting of a chromium derivative to form 6-hexanaloic acid.

One useful aspect of this new process resides in the recovery of 6-hexanaloic acid, which is a precursor for polyesters and for polyamides. From another view point, the cyclohexane solutions of cyclohexyl hydroperoxide treated in this way contain less oxidation by-products and are more suitable for certain known applications.

Any cyclohexane oxidation product containing cyclohexyl hydroperoxide and prepared without a metallic catalyst can be treated in accordance with the process of the present invention, but the benefit derived from this treatment is the greater the higher the percentage of hydroperoxide content in the oxidized products. The process is very particularly applicable to the treatment of cyclohexane solutions of cyclohexyl hydroperoxide in which the oxidized products which are less volatile than the cyclohexane contain at least 50 percent by weight of peroxidic products. Such solutions can be prepared in accordance with the process described in French Patent No. 1,505,363 entitled "Perfectionnement à la préparation des cycloalcanols et des mélanges cycloalcanols/cycloalcanones" granted to Societe des Usines Chimiques Rhone-Poulenc on an application filed Apr. 20, 1966, as well as in accordance with the first stage of the process described in U.S. Pat. No. 2,931,834 entitled "Cyclohexane Oxidation process" granted to W. W. Crouch and J. C. Hillyer on an application filed Sept. 13, 1956. These solutions can be concentrated before washing by applying any known technique.

The washing with water is effected in the liquid phase at temperatures of between 5° and 100°C., preferably between 15° and 30°C., optionally under autogenic pressure or under increased pressure caused by an inert gas such as nitrogen, when the temperature employed is above the boiling point of the water-cyclohexane azeotrope. The weight of water used generally represents 0.01 to 1 times, preferably 0.05 to 0.5 times, the weight of solution to be washed. All the usual techniques of washing in the liquid phase can be used, and the process can be carried out continuously or discontinuously.

Before subjecting it to catalytic deperoxidation, the 6-hydroperoxyhexanoic acid can be purified. This purification can, for example, consist of an extraction of the aqueous solutions and washing by means of an alcohol, an ester or a ketone which is immiscible with water. The alcohols which can be used include the alkanols having four to 10 carbon atoms, the cycloalkanols having five to eight carbon atoms in the ring, optionally substituted by one or more alkyl groups with one to four carbon atoms, and phenylalkanols having seven to 10 carbon atoms. Suitable ketones are dialkyl ketones having four to 12 carbon atoms, cycloalkanones having from five to eight carbon atoms in the ring and optionally substituted by alkyl groups with one to four carbon atoms, phenyl alkyl ketones and cycloalkyl alkyl ketones having from eight to 10 carbon atoms. Amongst the esters which can be used for extraction of the 6-hydroperoxyhexanoic acid those derived from alkylcarboxylic acids having from two to eight carbon atoms and alkanols having from one to four carbon atoms are preferred.

More particular examples of extraction agents which meet the criteria enumerated above are ethyl acetate, amyl acetate, butyl propionate, methyl 2-ethylhexanoate, amyl alcohols, 2-ethylhexanol, 3-methyl-2-pentanol, the methycyclohexanols, methyl ethyl ketone, methyl isobutyl ketone, cyclohexanone, acetophenone and methyl propyl ketone. The extraction procedure can be carried out at temperatures between 10°C. and 30°C. and weights of extraction agents representing 0.5 to 5 times the weight of the aqueous solution to be extracted can be used.

The purification can be effected by removing the extraction agent, preferably under reduced pressure and at a temperature below 50°C.

The catalyst deperoxidation of 6-hydroperoxyhexanoic acid is effected in a solvent which can be water, one of the extraction agents mentioned above, a linear or cyclic ether, or an organic acid such as a lower alkanoic acid. When an organic solvent is used, an amount of water greater than 1 mol per mol of hydroperoxide involved should be present.

According to a preferred embodiment of the process, the 6-hydroperoxyhexanoic acid is used in the form of an aqueous solution; for technical and economic reasons, it is then advantageous to use such amounts of water that the percentage by weight of said hydroperoxide in the solution is between 1 and 20 percent.

Another particular embodiment of the process according to the invention consists of subjecting the aqueous wash solutions obtained from the first stage of the process directly to the action of the catalyst. Before subjecting such solutions containing 6-hydroperoxyhexanoic acid to the deperoxidation, the small amounts of cyclohexyl hydroperoxide, of cyclohexanol and of cyclohexanone present in these aqueous solutions can be extracted from them by means of a liquid hydrocarbon such as cyclohexane. It is also possible to concentrate the solutions beforehand, preferably under reduced pressure and at a temperature not exceeding 50°C., and then to separate the diacids which precipitate, if necessary after cooling. In fact, as the diacids present in the aqueous wash solutions do not interfere with the deperoxidation reaction, that reaction can be carried out without previous separation of the diacids.

The chromium compounds which can be used for the deperoxidation of 6-hydroperoxyhexanoic acid are those which have a solubility of at least 0.1 g. per liter in water at ordinary temperature. Amongst them, there may be mentioned especially chromium (VI) oxide as well as the hydrated salts of chromium (III), such as the chloride, nitrate, oxalate and sulphate. The preferred catalysts are $CrO_3$ and $CrCl_3 \cdot 6H_2O$. The amounts of catalyst used are such that they introduce from 0.05 to 20 and preferably from 0.1 to 15 gram atoms of elementary metal per 100 mols of hydroperoxide present. The operating temperature depends to a certain extent on the catalyst employed. As a general rule, the deperoxidation is carried out at temperatures between 20°C. and 120°C. and preferably between 50° and 100°C.

In practice, in order to carry out the process according to the invention, the hydroperoxide, the water and, when used, the organic solvent are mixed at ordinary temperature and the catalyst is then added; thereafter the mixture is heated, where necessary, to the selected temperature. According to a variant, the catalyst can be introduced into the mixture of the other constituents which have previously been heated to the chosen temperature.

When the mixture contains immiscible phases, it is advisable to assist their contact by any means of stirring which is usual in this technique.

As the deperoxidation reaction is exothermic, the temperature can subsequently be regulated by any system of regulation which is suitable for removing the heat evolved in a reaction. When the selected temperature is above the boiling point of the mixture, the reaction can be carried out under pressure in a suitable apparatus. The mixture can be maintained in the liquid phase, where appropriate, by introducing an inert gas such as nitrogen or argon. At the end of the reaction, the 6-hexanaloic acid can be separated from the residual mixture in accordance with customary processes, for example by distillation. It can also be isolated via one of its crystalline derivatives such as the 2,4,-dinitrophenylhydrazone or semicarbazone.

The following Examples illustrate the invention.

EXAMPLE 1 a. 368 g. of water at 30°C. are added to 9,370 g. of a cyclohexane hydroperoxide solution, which is obtained by oxidation of cyclohexane in the liquid phase, without catalyst, by means of air of reduced oxygen content and preconcentration, and the mixture is then stirred for about one minute. The aqueous phase is separated from the organic phase and this procedure is repeated twice more. The combined aqueous solutions thus obtained are washed twice, using 460 cc. of cyclohexane each time; the aqueous phase, which weighs 1,225 g., is retained. Determinations carried out on an aliquot part show that it contains 0.77 mol of 6-hydroperoxyhexanoic acid.

The aqueous phase is separated and extracted four times with 350 g. of ethyl acetate each time, and the organic phase is then concentrated at 20°C. under 100 mm. Hg. After filtering off adipic acid, 138 g. of an oil containing 103 g. of 6-hydroperoxy-hexanoic acid are left, the remainder consisting essentially of hydroxycaproic acid and diacids.

b. 20 g. of this oil are dissolved in 100 cc. of water and the solution is heated to the boiling point. 1 cc. of a solution prepared from 97.6 g. of water and 0.014 g. of chromium trioxide is then added and the mixture is thereafter kept at the boiling point for 30 minutes.

After cooling, examination of the final mixture by NMR and determination by oxime formation show that this mixture contains 12.3 g. of 6-hexanaloic acid, representing a yield of 94 percent relative to the 6-hydroperoxyhexanoic acid in the initial oil.

An aliquot part is treated with semicarbazide hydrochloride in the presence of sodium acetate, yielding a semicarbazone of melting point 173°C.

EXAMPLE 2

An aqueous solution prepared from 1cc. of water and 0.066 g. of CrCl$_3$·6H$_2$O is added to 161 g. of the aqueous wash solution obtained according to Example 1 after extraction with cyclohexane, and the whole is heated at the boiling point for 30 minutes. After cooling, it is found, in accordance with the methods indicated in Example 1, that the final mixture contains 12.9 g. of 6-hexanaloic acid, representing a yield of 99 percent relative to the 6-hydroperoxyhexanoic acid present in the initial aqueous wash solution.

We claim:

1. Process for obtaining 6-hexanaloic acid from by-products present in the cyclohexyl hydroperoxide solutions obtained by oxidation of cyclohexane in the liquid phase, without a metallic catalyst, by means of a gas containing molecular oxygen, which comprises washing with water said cyclohexyl hydroperoxide solutions, separating the aqueous phase, and subjecting the 6-hydroperoxy-hexanoic acid contained in the wash solution to deperoxidation by the action of an aqueous solution of a catalyst consisting of a chromium compound having a solubility in water of at least 0.1 g. per liter of water at ordinary temperature, to form 6-hexanaloic acid.

2. Process according to claim 1 in which the cyclohexyl hydroperoxide solution is washed with water at a temperature between 15° and 30°C.

3. Process according to claim 1 in which the cyclohexyl hydroperoxide solution is washed with 0.01 to 1 times its weight of water.

4. Process according to claim 1 in which the 6-hydroperoxyhexanoic acid present in the aqueous wash solution is extracted from said wash solution by means of a solvent selected from alcohols, esters and ketones which are immiscible with water.

5. Process according to claim 4 in which 6-hydroperoxyhexanoic acid is extracted from the aqueous wash solution with a solvent selected from ethyl acetate, amyl acetate, butyl propionate, methyl 2-ethylhexanoate, amyl alcohols, 2-ethylhexanol, 3-methyl-2-pentanol, methylcyclohexanols, methyl ethyl ketone, methyl isobutyl ketone, cyclohexanone, acetophenone and methyl propyl ketone.

6. Process according to claim 4 in which the extraction of the 6-hydroperoxyhexanoic acid from the aqueous wash solution is preceded by treatment of the wash solution with a liquid hydrocarbon to remove therefrom substances selected from cyclohexyl hydroperoxide, cyclohexanol and cyclohexanone.

7. Process according to claim 1 in which the 6-hydroperoxyhexanoic acid in solution in a solvent selected from water, alcohols, esters and ketones which are immiscible with water, linear and cyclic ethers and organic acids, is deperoxidized by an aqueous solution of a chromium compound having a solubility of at least 0.1 g. per liter of water at ordinary temperature.

8. Process according to claim 7 in which the chromium compound consists essentially of chromium oxide or a hydrated salt of chromium chloride, chromium nitrate, chromium oxalate or chromium sulphate.

9. Process according to claim 7 in which the chromium compound consists essentially of chromium oxide or hydrated chromium chloride.

10. Process according to claim 7 wherein the amount of chromium catalyst employed provides from 0.05 to 20 gram atoms of elementary metal per 100 mols of 6-hydroperoxyhexanoic acid to be deperoxidized.

11. Process according to claim 7 in which the deperoxidation of 6-hydroperoxyhexanoic acid to 6-hexanaloic acid is effected at a temperature between 20° and 120°C.

12. Process according to claim 1 in which the 6-hydroperoxyhexanoic acid in solution in water is deperoxidized to 6-hexanaloic acid by treatment with an aqueous solution of a catalyst consists essentially of chromium oxide or a hydrated salt of chromium chloride, chromium nitrate, chromium oxalate or chromium sulphate, the amount of chromium catalyst being such as to provide from 0.05 to 20 gram atoms of elementary metal per 100 mols of 6-hydroperoxyhexanoic acid present, at a temperature between 50° and 100°C.

13. Process according to claim 12 in which the initial aqueous solution of 6-hydroperoxyhexanoic acid contains from 1 to 20 percent by weight of hydroperoxide.

14. Process according to claim 1 for obtaining 6-hexanaloic acid from by-products present in the cyclohexyl hydroperoxide solutions obtained by oxidation of cyclohexane in the liquid phase, without a metallic catalyst, by means of a gas containing molecular oxygen, which comprises washing with water at a temperature between 15° and 30°C. said cyclohexylperoxide solutions, separating the aqueous phase, extracting from the aqueous wash solution the 6-hydroperoxyhexanoic acid contained therein with a solvent selected from alcohols, esters and ketones immiscible with water, removing the said solvent and subjecting the 6-hydroperoxyhexanoic acid in solution in water containing from 1 to 20 percent by weight of hydroperoxide to deperoxidation by treatment with an aqueous solution of a catalyst consists essentially of chromium oxide or a hydrated salt of chromium chloride, chromium nitrate, chromium oxalate or chromium sulphate, the amount of chromium catalyst being such as to provide from 0.05 to 20 gram atoms of elementary metal per 100 mols of 6-hydroperoxyhexanoic acid present, at a temperature between 50° and 100°C.

15. Process according to claim 1 for obtaining 6-hexanaloic acid from by-products present in the cyclohexyl hydroperoxide solutions obtained by oxidation of cyclohexane in the liquid phase, without a metallic catalyst, by means of a gas containing molecular oxygen, which comprises washing with water at a temperature between 15° and 30°C. said cyclohexylperoxide solutions, separating the aqueous phase, treating the aqueous wash solution with a liquid hydrocarbon to remove therefrom substances selected from cyclohexyl hydroperoxide, cyclohexanol and cyclohexanone, separating the resulting aqueous solution of 6-hydroperoxyhexanoic acid and subjecting said acid in the aqueous solution to deperoxidation by treatment with an aqueous solution of a catalyst consists essentially of chromium oxide or a hydrated salt of chromium chloride, chromium nitrate, chromium oxalate or chromium sulphate, the amount of chromium catalyst being such as to provide from 0.05 to 20 gram atoms of elementary metal per 100 mols of 6-hydroperoxyhexanoic acid present, at a temperature between 50° and 100°C.

* * * * *